Oct. 15, 1935.     R. S. NELSON     2,017,288
REFRIGERATION APPARATUS
Filed July 17, 1933     3 Sheets-Sheet 1
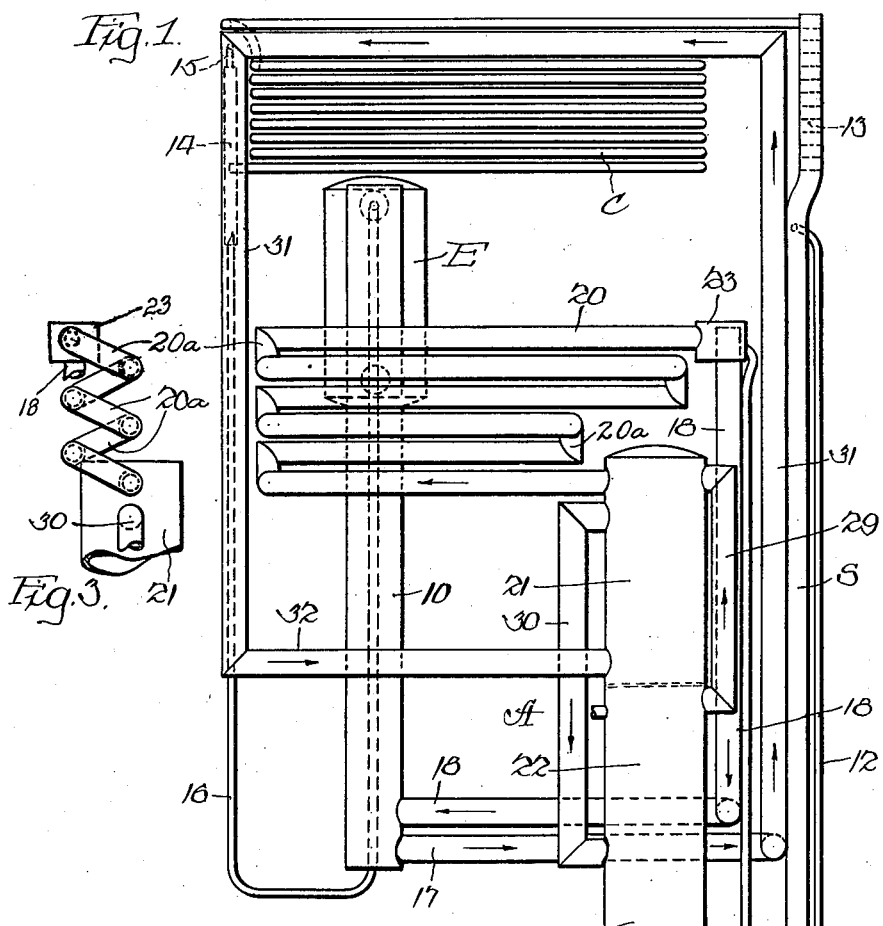
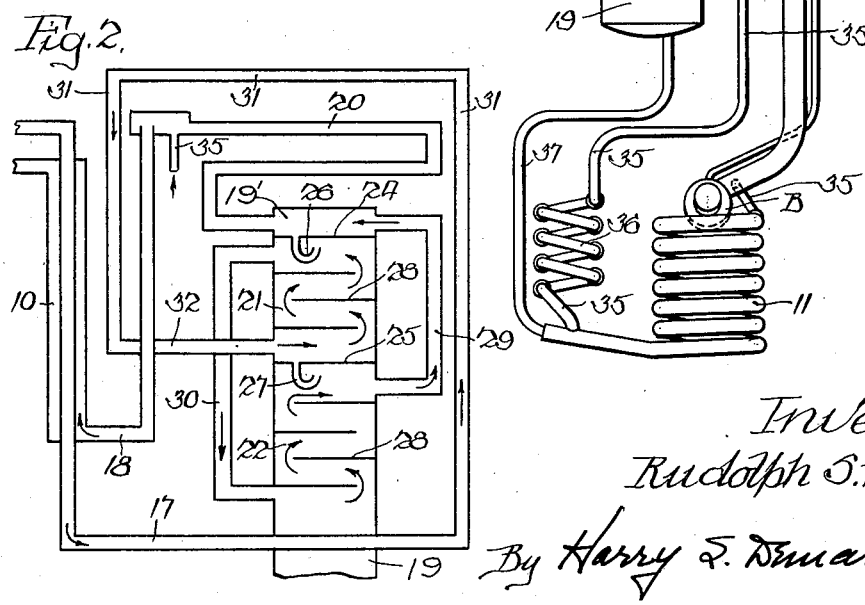
Inventor.
Rudolph S. Nelson.
By Harry S. Demarse, Atty.

Oct. 15, 1935.  R. S. NELSON  2,017,288
REFRIGERATION APPARATUS
Filed July 17, 1933   3 Sheets-Sheet 2

Inventor:
Rudolph S. Nelson.
By Harry S. Dumares Atty.

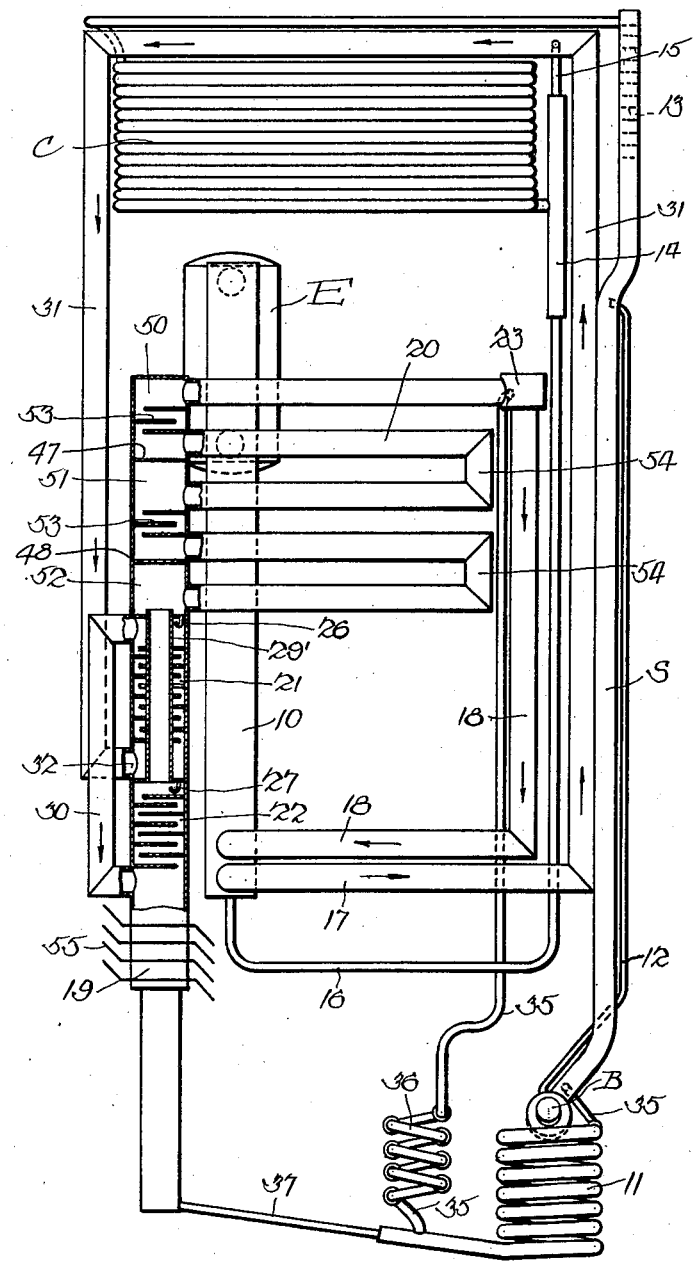

Patented Oct. 15, 1935

2,017,288

UNITED STATES PATENT OFFICE 2,017,288

REFRIGERATION APPARATUS

Rudolph S. Nelson, Rockford, Ill., assignor to The Hoover Company, North Canton, Ohio, a corporation of Ohio Application July 17, 1933, Serial No. 680,750

11 Claims. (Cl. 261—21)

This invention relates to continuous absorption refrigerating apparatus and more particularly to the construction of the absorber thereof.

In a companion case Serial No. 780,749 filed July 17, 1933, a three part absorber for absorption refrigerating system using inert gas is disclosed, the aforesaid application being a continuation in part of application Serial No. 539,450 filed May 23, 1931, which also disclosed a three part absorber. In so far as common subject matter is concerned the present application may be regarded as a continuation in part of both the aforesaid application inasmuch as it relates to similar subject matter. The aforesaid application Serial No. 780,749 filed July 17, 1933, containing claims on the absorber which are generic to the specific forms claimed herein. The present application is limited to the absorber per se, various features of the absorption refrigerating apparatus illustrated being claimed in other applications.

It is an object of the present application to devise an absorber particularly suited for use in absorption refrigerating systems employing an inert gas and in which it is desired to remove as much refrigerant as possible from the inert gas in the absorber before it passes back to the evaporator and in which it is desired to bring the absorption solution to as strong a concentration as possible at the temperature available for cooling the absorber, before the absorption solution is conveyed back to the boiler.

In the companion case Serial No. 780,749 filed July 17, 1933, the three part absorber is shown as consisting of two sections made up of pieces of pipe, and one section made up of a vertically disposed cylinder. In the present case the absorber shown consists of one section made up of pieces of pipe and two sections provided in a vertically disposed cylinder.

Other objects and advantages reside in certain novel features of the arrangement and construction of parts as will be apparent after consideration of the following description taken in connection with the accompanying drawings in which, Figure 1 is a view in elevation of a refrigerating apparatus constructed in accordance with the principles of the present invention.

Figure 2 is a diagram of the absorber and associated conduits as connected in the arrangement of Figure 1.

Figure 3 is a fragmentary side view of the upper section of the absorber of Figure 1 showing the arrangement of conduits.

Figure 5 is a view in elevation of the still further modification of the invention.

Figure 4:
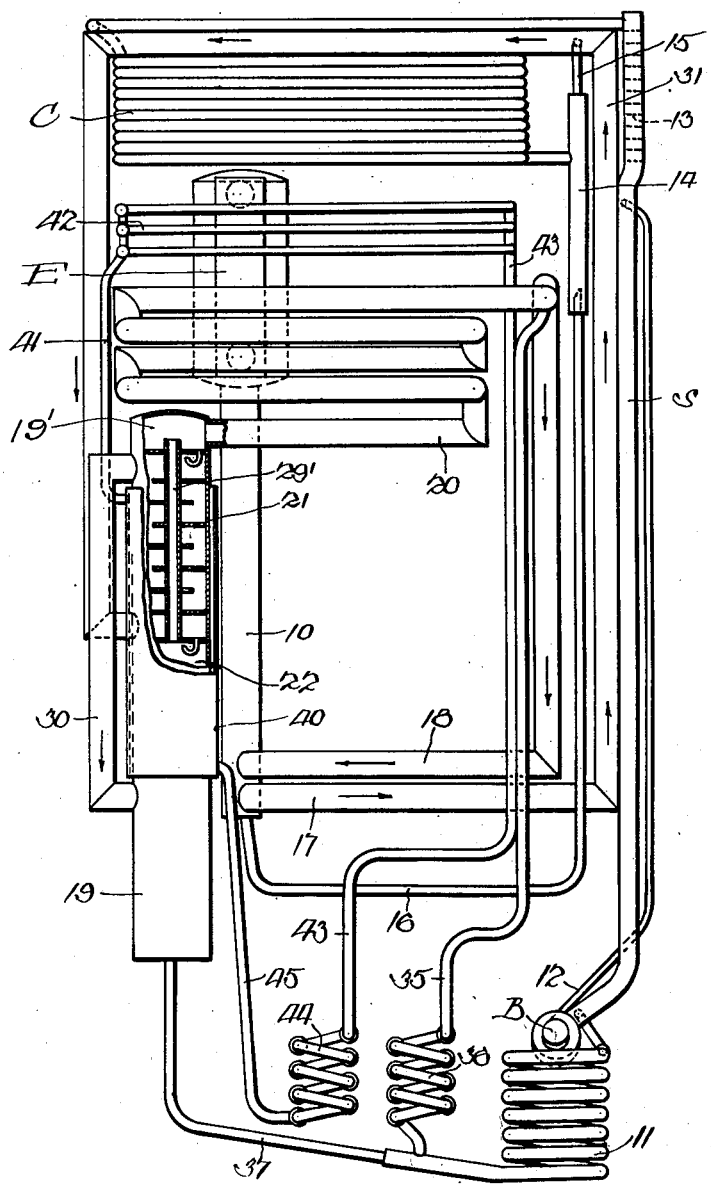
Figure 4 is a view in elevation of a modified form of the invention, certain parts of the absorber being shown as broken away to illustrate the construction.

Referring in detail first to the embodiment shown in Figures 1 to 3 a continuous absorption refrigerating system using inert gas is shown as made up of the boiler B, a gas separating chamber S, condenser C, an evaporator E, a gas heat exchanger 10 as essential elements, these parts being connected by various conduits to form the complete continuous absorption refrigerating system.

The system may be charged with ammonia as refrigerant, water as absorption liquid and hydrogen as the inert gas in accordance with well known practices.

The conduit 12 which acts as a gas lift pump in accordance with well-known principles, is connected to the top of the boiler and to the gas separating chamber S near the upper portion thereof. The gas separating chamber S consists of a long pipe running down the side in the unit and having inside of its upper end a number of baffle plates as indicated in 13, so as to cause this portion to act as a rectifier. The upper portion of the gas separating chamber S is connected to the condenser C, which may be an oval-shaped coil of pipe or a number of small pipes connected to headers, the oval coil type being shown. The lower end of the condenser is connected to a vent chamber 14, the upper end of which is provided with a conduit 15 which is adapted to convey any inert gas which may have found its way in the chamber 14 back to the absorber. A conduit 16 is connected to the lower end of the chamber 14 and this conduit passes downwardly and enters the bottom of the gas heat exchanger 10 through which it passes upwardly to the top of the evaporator.

The evaporator E may be of any suitable construction, the one illustrated consisting merely of a cylindrical tank provided with a number of baffles for retaining condensed refrigerant thereon. A vertical type of gas heat exchanger similar to that disclosed and claimed in the copending application of R. S. Nelson, Serial No. 539,450 filed May 23, 1931, is illustrated in Figure 1. This device consisting of a double conduit for conveying inert gas from the top of the evaporator to a conduit 17 connected to the lower end of the heat exchanger and for conveying gas from a conduit 18 near the lower end of the heat exchanger to the lower end of the evaporator while causing the transfer of heat from the gases flowing upwardly to the gases flowing downwardly therein.

The present invention relates to the construction of the absorber which will now be described in detail, and which is shown diagrammatically in Figure 2. The absorber consists of three parts designated 20, 21 and 22 respectively. The upper section 20 is made up of a number of nearly horizontally disposed pipes adapted to extend across the rear of the cabinet in which the refrigerating unit may be mounted. The horizontal pipes are connected by short inclined pipes 20a as shown in Figure 3, these short pipes being alternately located so as to provide a tortuous path for the flow of fluids through this section. A small chamber 23 forming a sump is provided at the upper end of the section 20, while the lower end thereof is connected to a vertical cylinder 19. This cylinder constitutes the main part of both sections 21 and 22 as well as providing a reservoir for absorption liquid at the lower part thereof. As shown in Figure 2 this cylinder is provided with two partitions designed 24 and 25 respectively for dividing the cylinder into three compartments. Each of the partitions 24 and 25 is provided with a small hook shaped conduit as indicated in 26 and 27 for permitting the flow of absorption liquid from one compartment to another.

Each of the lower two compartments in the main vertical cylinder of the absorber is provided with a number of baffle plates designated 28 for retaining absorption liquid thereon and for causing the gases passing through the absorber to flow over the extended surface provided thereby. A conduit 29 provides means for conducting the gases from the top of the lower compartment 22 to the upper compartment thereof, while the conduit 30 provides means for conveying gases from the top of the central compartment 21 to the bottom of the lower compartment 22.

Gases leaving the gas heat exchanger 10 flow horizontally across the unit through the conduit 17 into the right-hand leg (as viewed in Figures 1 and 2) of an inverted ∩ shaped conduit 31, the left hand leg of which is in turn connected to a horizontal conduit 32 which conveys the inert gas and refrigerant gas into the lower portion of the central compartment 21 of the main cylinder of the absorber. After flowing upwardly across the baffle 28 in this compartment the gases flow through the conduit 30 to the bottom of the lower compartment 22 of this cylinder, then upwardly across baffle 28 in this compartment, though the conduit 29, and after passing through the upper compartment 191 of the cylinder flow upwardly through the upper section 20 into the chamber 23 and through the conduit 18 back to the gas heat exchanger 10.

Absorption liquid is supplied to the chamber 23 at the top of the absorber section 20 by means of a conduit 35, this conduit being connected to the bottom of the gas separating chamber S.

Over a portion of its length the conduit 35 is in heat exchange relation with the conduit 37, as shown at 11. The conduit 35 also has a number of heat radiating fins on a coil portion 36 which act as a pre-cooler for the absorption liquid entering the absorber.

The liquid entering the absorber flows downwardly through the section 20 and into the upper compartment 191 of the main cylinder 19 of the absorber where it collects and passes through the conduit 26 onto the baffle 28 in the absorber section 21. After trickling downwardly over these baffles it is collected on the partition member 25 and passes through the conduit 27 onto the baffles 28 in the lower section 22 of the absorber. After trickling downwardly over these baffles it is collected in the lower portion of the cylinder 19, which acts as a reservoir, and from there it is conveyed back to the boiler by means of the conduit 37, a portion of which acts as the inner conduit of the liquid heat exchanger 11.

It will thus be seen that in the arrangement of Figures 1 to 3 the gases and liquids passing through the absorber flow in counterflow in all of the sections thereof when considered individually, but that the gas flows first through section 21, then through section 22 and then through section 20 whereas the liquid flows first through section 20, then section 21 and then section 22.

As has been pointed out in application Serial No. 780,749 filed July 17, 1933, this peculiar flow of fluid through the absorber has the advantage of permitting both the inert gas leaving the absorber on its way back to the evaporator and the absorption liquid leaving the absorber on its way back to the boiler to reach the best operating condition possible under the temperature conditions prevailing. The inert gas about to leave the absorber through the conduit 18 is brought into contact with the weak absorption liquid entering the absorber through the conduit 35 at as low a temperature as is possible with the cooling medium available. The inert gas is thus stripped of as much refrigerant vapor as is possible before it passes back to the evaporator.

On the other hand, since the inert gas, rich in refrigerant gas, coming from the evaporator enters first the section 21 of the absorber this section will operate at a high temperature and complete absorption cannot take place therein. By conducting the gases out of the top of this compartment, however, and into the compartment 22 further absorption can take place because the section 22 will operate at a lower temperature than the section 21. Thus the absorption liquid comes in contact with the refrigerant gases in the section 22 at the lowest temperature available for cooling, and thus reach a higher degree of concentration than would be possible were all the sections of the absorber operating at the same temperature. The above described arrangement is of particular advantage in connection with air cooled apparatus. Where water cooling is employed it is comparatively easy to maintain the temperature of the absorber reasonably near to that of the water. With air cooling, however, the maintenance of an absorber temperature reasonably close to that of the air is quite difficult especially if the absorber is located at an inaccessible point and if no air circulating means such as a fan is employed. By providing a separate compartment, such as the compartment 22 where the absorption liquid leaving the absorber may come in contact with the refrigerant laden inert gas at a relatively low temperature, that is at one fairly close to the temperature of the air, the disadvantage inherent in air cooling is largely removed.

Figure 4 shows an arrangement which is similar to that of Figures 1 to 3 except that the assembly of the various parts of the absorber is more compact and an indirect cooling system is employed for cooling the lower section of the absorber. In Figure 4 the same reference characters are employed to designate parts which correspond to those of Figure 1.

As in Figure 1, it will be seen that Figure 4 discloses an absorber made up of three parts designated 20, 21 and 22, the parts 21 and 22 being compartments formed in a vertically extending closed cylinder designated generally at 19.

The part 20 of the absorber consists of a number of pieces of pipe substantially horizontally arranged and connected by short inclined pieces just as illustrated and described in connection with Figure 1. The part 21 and 22 differ from the correspondingly designated parts of Figure 1, in that in this case the conduit which conveys the gases from the lower compartment 22 to the small chamber at the top of the vessel 19 extends up through the central part of the vessel 19 instead of passing around the outside. In Figure 4 this centrally located conduit is designated 29.

The flow of inert gas through the absorber is identical with that of Figures 1 and 2, the gas leaving the lower end of the heat exchanger 16 through the conduit 17 passing into the right hand leg of the inverted U shaped conduit 31 and after flowing upwardly in this leg and across the top of the unit, passes downwardly in the left hand leg of the conduit 31 and enters the lower part of the upper compartment 21 in the cylinder 19. After flowing upwardly across the baffles therein the gases flow through the conduit 30 to the bottom of the lower compartment 22. The gases then pass upwardly across the baffles (not shown) in the lower compartment 22 and then upwardly through the centrally located conduit 29' into the small chamber 19' at the top of the cylinder 19 and from there into the upper section 20 of the absorber. After passing in counterflow with the liquid in the section 20 the gases enter the conduit 18 and return to the gas heat exchanger 16.

In Figure 4 an arrangement for indirectly cooling the compartment 21 and 22 is illustrated. This arrangement consists of a jacket 40 (shown partially broken away) the upper end of which is connected by a conduit 41 with an auxiliary condenser 42. From the right hand side of the condenser 42 a conduit 43 passes downwardly, and is connected to a coil 44 located some distance below the absorber. The lower end of the coil 44 is connected to the lower end of the jacket 40 by means of a conduit 45. The elements 40 to 45 inclusive thus form a closed circuit for the flow of a fluid such as a refrigerant fluid, entirely independent of the remainder of the system.

Heat taken up from the absorber by the fluid in the jacket 40 causes the fluid to vaporize to some extent and pass upwardly through the conduit 41 into the condenser 42. The conduit 41 being of small diameter some of the liquid in the jacket 40 will pass upwardly with this gas and collect in the lower part of the condenser 42 while the vaporized portion passes on upwardly to the upper part thereof. The vapor will condense in the upper part of the condenser 42 and join the liquid at the right hand side and flow downwardly through the conduit 43 into the coil 44 where the temperature will be further reduced. The liquid will then be returned to the jacket 40 by means of the conduit 45. It will thus be seen that means is provided for discharging heat above the absorber, in the condenser 42, and also at a point below the absorber in the coil 44.

Figure 5 discloses a construction similar to that of Figures 1 to 3, and also similar to some extent to that of Figure 4. The general arrangement of the boiler, gas separating chamber, condenser, evaporator and associated parts is the same as that of Figure 1 and the parts are similarly designated.

As in Figure 4 the absorber consists of three parts designated 20, 21 and 22, parts 21 and 22 being compartments in a cylinder 19.

It will be noted that in Figure 5 the cylinder 19 is considerably longer than that of either Figure 1 or Figure 4, and that the upper part of this cylinder forms a part of the upper section 20 of the absorber. In the construction shown, three small chambers are formed by means of partitions 47 and 48, these chambers being designated 50, 51 and 52. Each chamber is joined to horizontally extending pipes to form the upper section 20. Thus the upper chamber 50 connects with the two upper horizontal conduits; chamber 51 connects with the next two horizontal conduits and the chamber 52 is connected with the lower conduit and with the vertically extending pipe 29'. Each of the chambers 50 and 51 contains a few baffle plates as indicated in 53, the baffle plates being located in between the points where the horizontal pipes are connected to the chambers. By connecting the second and third horizontal pipes and the fourth and fifth by means of a short section 54, a tortuous path for the flow of gases and liquids through the section 20 of the absorber is provided. The compartments 21 and 22 in this figure are disposed the same as in Figure 4. The compartment 21 is connected at its lower end with the left hand leg of the inverted U shaped conduit 31 while the top of compartment 21 is connected with the bottom of the lower compartment 22 by means of the conduit 30. The upper end of the lower compartment 22 is connected to the small chamber 52 formed in the cylinder 19 above the compartment 21.

It will be seen that gases coming from the evaporator through the gas heat exchanger 10 will flow through the conduit 17 into the inverted U shaped conduit 31, and after flowing through this conduit will emerge from the left hand leg and enter the lower end of the section 21 and after flowing upwardly through this section over the baffles therein, pass downwardly through the conduit 30 into the lower end of the lower compartment 22. After passing upwardly through this section of the absorber the gases will flow through the central conduit 29' into the lower chamber 52 of the section 20. The gases will then flow through the two lower horizontal pipes into the chamber 51 where they will pass upwardly across baffle plate 53 in that chamber and flow through the third and second horizontal pipes into the upper chamber 50. After passing across the baffle plate 53 in the upper chamber 50 the gases will flow through the upper horizontal pipe into the sump chamber 23 and from there downwardly through the conduit 18 back to the heat exchanger 16.

Absorption liquid supplied to the section 20 of the absorber by the conduit 35 will flow across the top horizontal pipe into the chamber 50 downwardly across the baffle plates therein through the second and third horizontal pipes into the chamber 51, downwardly across the baffle plate 53 therein through the fourth and fifth horizontal pipe into the chamber 52. From the chamber 52 the liquid will pass through the small trap 26 and flow downwardly across the baffles in the compartment 21, then through a second small U bent pipe 27 and across the baffies in the compartment 22 into the lower part of the cylinder 19 from which point the circuit will be the same as that described in connection with Figure 1.

While no indirect cooling system is shown in connection with Figure 1 or Figure 5, it is obvious that means might be associated with the portion of the cylinder 19 which constitutes the portions 21 and 22 of the absorber of either of these figures, for transferring heat from these portions to a point either above, or below the absorber. In addition to this, heat radiating fins such as indicated at 55 in Figure 5 may be provided on the cylinder 19 in various places to facilitate air cooling the same.

While only a few embodiments of the invention have been shown and described herein, it is obvious that many changes may be made in the construction and arrangement of the parts without departing from the spirit of the invention or the scope of the annexed claims.

I claim:

1. In an absorption refrigerating system, an absorber having three parts, one of which consists of a conduit having a number of bends therein to provide a tortuous path for the flow of fluids therethrough, the second of which consists of a vessel located below the first mentioned part and the third of which consists of a vessel located below the second mentioned part, said second and third mentioned parts having baffle plates therein, means for causing absorption liquid to flow by gravity through said parts in the order recited and means for causing an inert gas laden with gas to be absorbed by the absorption liquid to flow through the second mentioned part, then through the third mentioned part and then through the first mentioned part.

2. In an absorption refrigerating system, an absorber having three parts, one of which consists of a conduit having a number of bends therein to provide a tortuous path for the flow of fluids therethrough, the second of which consists of a vessel located below the first mentioned part and the third of which consists of a vessel located below the second mentioned part, said second and third mentioned parts having baffle plates therein, means for causing absorption liquid to flow by gravity through said parts in the order recited, means for causing an inert gas laden with gas to be absorbed by the absorption liquid to flow through the second mentioned part, then through the third mentioned part and then through the first mentioned part, and means for indirectly air cooling one of said lower parts.

3. In an absorption refrigerating system, an absorber having three parts, one of which consists of a conduit having a number of bends therein to provide a tortuous path for the flow of fluids therethrough, the second of which consists of a vessel located below the first mentioned part and the third of which consists of a vessel located below the second mentioned part, said second and third mentioned parts having baffle plates therein, means for causing absorption liquid to flow by gravity through said parts in the order recited, means for supplying refrigerant gas to said parts and means for transferring heat from one of said lower parts to a point above said first mentioned part and for discharging heat from said point to the atmosphere.

4. In an absorption refrigerating system, an absorber having three parts, one of which consists of a conduit having a number of bends therein to provide a tortuous path for the flow of fluids therethrough, the second of which consists of a vessel located below the first mentioned part and the third of which consists of a vessel located below the second mentioned part, said second and third mentioned parts having baffle plates therein, means for causing absorption liquid to flow by gravity through said parts in the order recited and means for causing an inert gas laden with gas to be absorbed by the absorption liquid to flow through the second mentioned part, then through the third mentioned part and then through the first mentioned part, said last mentioned means including a conduit for supplying the gases to the lower portion of said section mentioned part, a conduit for conveying gases from the top of the second mentioned part to the bottom of the third mentioned part and a conduit for conveying the gases from the top of the third mentioned part to the bottom of the first mentioned part.

5. In an absorportion refrigerating system, an absorber having three parts, one of which consists of a conduit having a number of bends therein to provide a tortuous path for the flow of fluids therethrough, the second of which consists of a vessel located below the first mentioned part and the third of which consists of a vessel located below the second mentioned part, said second and third mentioned parts having baffle plates therein, means for causing absorption liquid to flow by gravity through said parts in the order recited and means for causing an inert gas laden with gas to be absorbed by the absorption liquid to flow through the second mentioned part, then through the third mentioned part and then through the first mentioned part, said last mentioned means including a conduit for supplying the gases to the lower portion of said second mentioned part, a conduit for conveying the gases from the top of the second mentioned part to the bottom of the third mentioned part and a conduit for conveying the gases from the top of the third mentioned part to the bottom of the first mentioned part, the last mentioned conduit passing around the second mentioned part of the absorber.

6. In an absorption refrigerating system, an absorber having three parts, one of which consists of a conduit having a number of bends therein to provide a tortuous path for the flow of fluids therethrough, the second of which consists of a vessel located below the first mentioned part and the third of which consists of a vessel located below the second mentioned part, said second and third mentioned parts having baffle plates therein, means for causing absorption liquid to flow by gravity through said parts in the order recited and means for causing an inert gas laden with gas to be absorbed by the absorption liquid to flow through the second mentioned part, then through the third mentioned part and then through the first mentioned part, said last mentioned means including a conduit for supplying the gases to the lower portion of said second mentioned part, a conduit for conveying the gases from the top of the second mentioned part to the bottom of the third mentioned part and a conduit for conveying the gases from the top of the third mentioned part to the bottom of the first mentioned part, the last mentioned conduit passing through the second mentioned part of the absorber.

7. In absorption refrigerating apparatus, an absorber consisting of a vertically disposed cylinder the upper portion of which is provided with partitions dividing the space therein into chambers, and the lower portion of which is provided with partitions dividing the space therein into a number of compartments, said compartments constituting parts of the absorber, conduits having extended horizontal portions connecting said chambers in series to constitute another part of the absorber and provide a tortuous path for the flow of fluids therethrough, means in the compartments for retaining absorption liquid in exposed relation with the gas to be absorbed, conduit means for supplying refrigerant gas and absorption liquid to said absorber and fluid conduit means for connecting the parts of the absorber together.

8. In absorption refrigerating apparatus, an absorber consisting of a vertically disposed cylinder the upper portion of which is provided with partitions dividing the space therein into chambers, and the lower portion of which is provided with partitions dividing the space therein into a number of compartments, said compartments constituting parts of the absorber, conduits having extended horizontal portions connecting said chambers in series to constitute another part of the absorber and provide a tortuous path for the flow of fluids therethrough, means in the compartments for retaining absorption liquid in exposed relation with the gas to be absorbed, means for causing an absorption liquid to flow through the parts of the absorber by gravity flow, and means for circulating an inert gas laden with gas to be absorbed through said parts, first through a centrally located part, then through a lower part and then through the upper part of the absorber.

9. In absorption refrigerating apparatus, an absorber consisting of a vertically disposed cylinder the upper portion of which is provided with partitions dividing the space therein into chambers, and the lower portion of which is provided with partitions dividing the space therein into a number of compartments, said compartments constituting parts of the absorber, conduits having extended horizontal portions connecting said chambers in series to constitute another part of the absorber and provide a tortuous path for the flow of fluids therethrough, conduit means for supplying refrigerant gas and absorption liquid to the absorber, means in the compartments for retaining absorption liquid in exposed relation with the gas to be absorbed, means for causing an absorption liquid to flow through the parts of the absorber by gravity flow, and means for air cooling all the parts of the absorber.

10. In an absorption refrigerating system, an absorber adapted to cause an absorption liquid to absorb a refrigerant gas out of an inert gas, said absorber having a plurality of parts, one of said parts consisting of a conduit shaped to provide a tortuous path for the flow of the absorption liquid and the gases therethrough and others of said parts consisting of a single cylindrical vessel having a partition therein and conduit means for supplying fluids to said parts and including conduits connecting said parts to transmit the absorption liquid, the refrigerant gas and the inert gas from one part to another the arrangement being such that the inert gas flows first through a part of the absorber which is intermediate in the flow of the absorption liquid therethrough.

11. In an absorption refrigerating system, an absorber adapted to cause an absorption liquid to absorb a refrigerant gas out of an inert gas, said absorber having a plurality of parts, one of said parts consisting of a conduit shaped to provide a tortuous path for the flow of the absorption liquid and the gases therethrough and others of said parts consisting of a single vertically disposed cylindrical vessel having a partition therein, conduit means for supplying fluids to said parts and including conduits connecting said parts to transmit the absorption liquid, the refrigerant gas and the inert gas from one part to another, the arrangement being such that the inert gas first enters the absorber at the upper part of said cylindrical vessel and means for indirectly cooling said cylindrical vessel.

RUDOLPH S. NELSON.